United States Patent [19]

Conti et al.

[11] Patent Number: 5,027,864

[45] Date of Patent: Jul. 2, 1991

[54] TUBULAR APPARATUS FOR TRANSMISSION CABLE

[75] Inventors: Allen C. Conti, Garfield Heights; Armand R. Conti, Youngstown, both of Ohio

[73] Assignee: Arnco Corporation, Elyria, Ohio

[21] Appl. No.: 433,383

[22] Filed: Nov. 3, 1989

Related U.S. Application Data

[60] Continuation of Ser. No. 736,359, May 21, 1985, abandoned, which is a division of Ser. No. 625,657, Jun. 28, 1984, Pat. No. 4,565,351.

[51] Int. Cl.$^5$ ...................... F16L 11/04; E21C 29/16
[52] U.S. Cl. .................................. 138/177; 138/108; 138/121; 138/173; 138/DIG. 11; 174/68.3; 350/96.23
[58] Field of Search ............... 138/108, 111, 121, 173, 138/177, DIG. 11; 254/134; 174/37, 68 C; 350/96.23; 405/154, 156, 141, 137

[56] References Cited

U.S. PATENT DOCUMENTS

| | | |
|---|---|---|
| 125,596 | 4/1872 | Mayall . |
| D. 202,107 | 8/1965 | Moldt . |
| 293,752 | 2/1884 | Krahenbeihl . |
| 356,152 | 1/1887 | Munsie . |
| 360,782 | 4/1887 | Ober . |
| 412,095 | 10/1889 | Johnson . |
| 527,414 | 10/1894 | Dewees . |
| 855,106 | 5/1957 | Hensel . |
| 1,400,658 | 12/1921 | Brown . |
| 1,588,142 | 6/1926 | Rohrbach . |
| 1,593,367 | 7/1926 | Southworth . |
| 1,644,237 | 10/1927 | Christensen . |
| 1,742,353 | 1/1930 | Hunter . |
| 1,743,506 | 1/1930 | Watson . |
| 1,935,999 | 11/1933 | Tessky . |
| 1,953,915 | 10/1931 | Burgett . |
| 1,959,180 | 5/1934 | Stephens . |
| 1,959,194 | 5/1934 | Chapman . |
| 2,083,937 | 6/1937 | Begg . |
| 2,218,444 | 10/1942 | Vineyard . |
| 2,284,488 | 3/1942 | Johnson . |
| 2,347,912 | 5/1944 | Komives . |
| 2,375,614 | 5/1945 | Berger . |
| 2,382,966 | 8/1945 | Arens . |
| 2,387,729 | 10/1945 | Harvlie . |
| 2,420,221 | 5/1947 | Bell . |
| 2,432,641 | 12/1947 | Wilson . |
| 2,687,997 | 8/1954 | Marchard . |
| 2,736,897 | 2/1956 | Parsons ........................... 425/197 X |

(List continued on next page.)

FOREIGN PATENT DOCUMENTS

| | | | |
|---|---|---|---|
| 562069 | 11/1957 | Belgium ............................... | 138/111 |
| 627402 | 3/1930 | Fed. Rep. of Germany . | |
| 2411156 | 9/1975 | Fed. Rep. of Germany . | |
| 2515887 | 10/1981 | France . | |
| 51-14973 | 2/1976 | Japan . | |
| 208259 | 1/1940 | Switzerland . | |
| 523820 | 7/1940 | United Kingdom ................ | 138/108 |
| 2102909 | 2/1983 | United Kingdom ................ | 138/111 |

OTHER PUBLICATIONS

ARNCO Corporation brochure entitled "Suggested Procedures and Equipment for Placing Lightguide Cable", 1985.
Bell System Practices, AT&T Co Standard, "Innerduct Placing Underground", Section 628-200-215, Issue 1, Feb. 1981, Suggested Procedures and Equipment for Placing Lightguide Cable.

*Primary Examiner*—James E. Bryant, III
*Attorney, Agent, or Firm*—Pearne, Gordon, McCoy & Granger

[57] ABSTRACT

An inner duct is disclosed which can fit inside a duct and extend along a length thereof for receiving communication cable, particularly a light-guide cable. The inner duct has a continuous side wall with protruding ribs on the inside and outside surfaces to maintain an effective supply of lubricant during the installation of the inner duct and cable in the inner duct. The ribs on the inside surface of the inner duct guide the cable during the placement operation. It is preferred to install a plurality of inner ducts into a duct during which the ribs on the inner duct interlock with one another to prevent spiraling. The ribs also facilitate the dissipation of heat due to friction and ambient sources of heat.

9 Claims, 2 Drawing Sheets

U.S. PATENT DOCUMENTS

| | | | |
|---|---|---|---|
| 2,771,181 | 11/1956 | Montgomery . | |
| 2,817,003 | 12/1957 | Dusek . | |
| 2,821,092 | 1/1958 | Cordora . | |
| 2,831,737 | 4/1958 | Jacoby . | |
| 2,871,718 | 2/1959 | Schroeder . | |
| 2,876,334 | 3/1959 | Wojciak . | |
| 2,934,466 | 4/1960 | Molla . | |
| 3,056,102 | 9/1962 | Cornell . | |
| 3,086,629 | 4/1963 | Blitzer | 138/111 X |
| 3,093,162 | 6/1963 | Reilling . | |
| 3,143,147 | 8/1969 | Sellars . | |
| 3,161,210 | 12/1964 | Loof . | |
| 3,212,154 | 10/1965 | Crumpler . | |
| 3,240,233 | 3/1966 | Johnston . | |
| 3,340,233 | 3/1966 | Johnston | 138/108 |
| 3,363,879 | 1/1968 | Irik . | |
| 3,514,048 | 5/1970 | Lowery . | |
| 3,538,210 | 11/1970 | Gatto . | |
| 3,567,268 | 3/1971 | Peterson . | |
| 3,579,623 | 5/1971 | Thomson . | |
| 3,646,972 | 3/1972 | Kuypers | 138/111 |
| 3,657,942 | 4/1972 | Sullivan | 74/501 |
| 3,711,090 | 1/1973 | Fielder . | |
| 3,739,459 | 6/1973 | Otani | 138/154 |
| 3,756,244 | 9/1973 | Kinnear . | |
| 3,812,282 | 5/1974 | Johansson | 138/121 |
| 3,860,040 | 1/1975 | Sullivan . | |
| 3,871,048 | 3/1975 | Leigh . | |
| 3,875,530 | 4/1975 | Manoukian . | |
| 3,941,157 | 3/1976 | Barnett . | |
| 3,974,862 | 8/1976 | Fuhrmann . | |
| 4,016,356 | 4/1977 | McLoughlin . | |
| 4,038,489 | 7/1977 | Stenson . | |
| 4,048,807 | 9/1977 | Ellers . | |
| 4,101,114 | 7/1978 | Martin . | |
| 4,112,708 | 9/1978 | Fukudo | 74/501 E |
| 4,129,356 | 12/1978 | Oestrich . | |
| 4,155,963 | 5/1979 | DeVicchis . | |
| 4,161,966 | 7/1979 | Scheffler . | |
| 4,163,474 | 8/1979 | MacDonald . | |
| 4,182,581 | 1/1980 | Uehara . | |
| 4,197,628 | 4/1980 | Conti . | |
| 4,212,097 | 7/1980 | Portinari . | |
| 4,220,179 | 9/1980 | Scheffler . | |
| 4,272,155 | 6/1981 | Slaughter . | |
| 4,286,702 | 9/1981 | Langen . | |
| 4,314,648 | 2/1982 | Spamer . | |
| 4,331,322 | 5/1982 | Woodruff . | |
| 4,337,922 | 7/1982 | Streiff . | |
| 4,337,923 | 7/1982 | Smith . | |
| 4,345,363 | 8/1982 | Leuchs . | |
| 4,403,686 | 9/1983 | Rycenga . | |
| 4,410,012 | 10/1983 | Redding et al. | 138/121 |
| 4,411,409 | 10/1983 | Smith . | |
| 4,412,673 | 11/1983 | Ramsden . | |
| 4,496,037 | 1/1985 | Spamer . | |
| 4,508,500 | 4/1985 | French . | |
| 4,565,351 | 1/1986 | Conti . | |
| 4,576,207 | 3/1986 | Levine . | |
| 4,892,442 | 1/1990 | Shoffner | 138/141 |

TUBULAR APPARATUS FOR TRANSMISSION CABLE

This is a continuation of application Ser. No. 736,359 filed May 21, 1985, now abandoned which is a divisional of application Ser. No. 625,657 filed on June 28, 1984, now U.S. Pat. No. 4,565,351.

BACKGROUND OF THE INVENTION

This invention relates to a method and apparatus to protectively install a transmission cable in a duct, and more particularly, to providing one or more inner ducts which embody a construction to facilitate installation in a pre-existing duct for protectively receiving a transmission cable.

It is common practice to replace sheathed cables, particularly telephone communication cable in existing ducts. Reuse of these ducts greatly reduces the cable placement operation particularly where the existing cables traverse obstacles whether manmade or natural along a buried, submarine and/or aerial route. The use of existing ducts is also desirable where the route of the ducts is beneath city streets, residential or business property. To avoid the costs and time to expose a duct and cable along a route, an existing cable can be pulled by a winch line from the duct. The replacement cable may embody improved technology, particularly the use of optical fibers for transmission of communication signals, hereinafter referred to as light-guide cable. When cable having metal conductors is replaced with light-guide cables, considerably less space in the duct is occupied by the replacement cable because the diameter thereof is much less as compared with the diameter of the cable having metal conductors.

Light-guide cable ca be placed in the sheathing of an existing cable after the conductors are removed from the sheathing while the existing cable remains in situ. A method for removing the conductors from the cable in this manner is disclosed in my prior U.S. Pat. No. 4,197,628 and provides for forcing lubricant through a sleeve which is attached to one end of the sheathing and allowing the lubricant to flow along the conductors in the cable After the lubricant disperses in the sheathing, the conductors are withdrawn by applying a force to one end of the conductor Light-guide cable may then be reintroduced into the sheathing The placement operation of light-guide cable into an existing duct which may include placing the cable in the sheathing from an existing cable, requires special procedures to avoid damage to the light-guide cable. In my copending application Ser. Nos. 346,386 and 405,385, there is disclosed a method and apparatus to measure tension imposed on a cable by a pull line in a conduit which includes a tension meter coupled between the cable and the pull line. The tension meter includes a load cell connected to electronic circuitry for delivering a tension signal which is detected and used to control tension imposed on the cable. The use of the tension meter enables accurate control of the tension on the pull line, particularly when the pull line contacts the conduit or duct walls at bends which restrain the pull line and then after the cable is drawn beyond the bend, friction of the cable against the duct walls acts to resist movement of the cable. The strands of optical fiber in the light-guide cable are particularly susceptible to fatigue fractures due to an excursion of tension stress beyond a predetermined level, for example, about 500 pounds. Should the tension stresses exceed the predetermined level or even the yield point of the optical fiber material, the fibers may fracture, thus losing integrity and, therefore, usefulness.

SUMMARY OF THE INVENTION

It is, therefore, an object of the present invention to provide a method and apparatus to efficiently utilize duct space for the placement of transmission cable in a duct without damage to the duct and cable.

It is a further object of the present invention to provide a method and apparatus for protecting a cable during placement thereof in a duct.

It is a still further object of the present invention to provide a method and apparatus for reducing the friction while pulling transmission cable in a duct.

More particularly, one aspect of the present invention provides a method for installing transmission cable in a selected length of a duct by the steps comprising selecting a length of an inner duct which can fit inside the duct and extends along a selected length thereof, installing the inner duct inside the duct and installing transmission cable in the inner duct. Preferably, a bundle of inner ducts is selected which can fit inside the duct so that transmission cable can be installed in each of the inner ducts. The inner duct has a continuous side wall with protruding ribs on the external and/or internal wall surface to reduce friction during placement of the inner duct in the duct and placement of cable in the inner duct. The ribs extend in the direction of the length of inner duct at a closely-spaced and a generally parallel relationship to form lubricant reservoirs between the ribs. A lubricant is applied to the inner duct to fill the spaces between the external ribs as the inner duct is advanced in the duct. The inner duct also preferably includes internal ribs extending in the direction of the length thereof and protruding from the inside wall surface to engage with the outer peripheral surface of the transmission cable when advanced in the inner duct. Spaces between the ribs on the internal surface of the inner duct also form reservoirs for lubricant which is applied to the transmission cable while advanced into the inner duct.

The inner duct of the present invention comprises an open-ended, elongated hollow tube having a side wall made of synthetic plastic material with a continuous internal surface comprised of spaced-apart and generally parallel protruding internal ribs extending lengthwise of the internal surface, the internal ribs having a height and being spaced apart by a distance sufficient to contain a supply of lubricant therebetween. The internal ribs form the only area of frictional contact with the transmission cable when installed in the tube. Preferably, the side wall of the tube includes spaced-apart and generally parallel protruding external ribs extending lengthwise of the external wall surface The external ribs having a height and being spaced apart by a distance sufficient to contain a supply of lubricant therebetween. The external ribs form the only area of frictional contact with the duct during installation of the inner duct. The internal and external ribs preferably have an inverted V-shaped configuration so that the ribs present narrow edges for sliding contact with the cable and duct.

These features and advantages of the present invention as well as others will be more fully understood when the following description is read in light of the accompanying drawings, in which.

Figure 1:
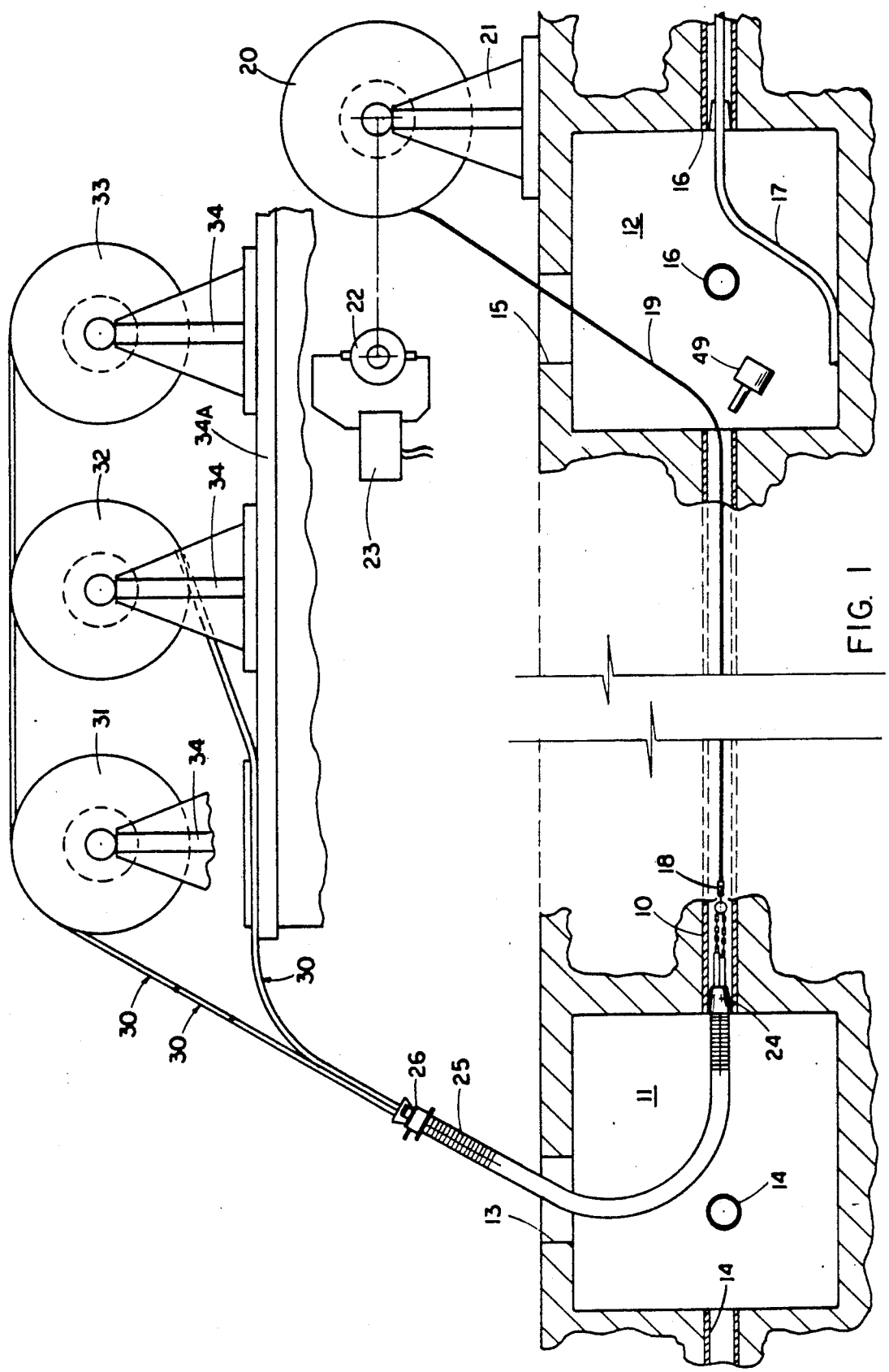
FIG. 1 is an elevational view, in section, illustrating the general organization of parts for installing transmission cable in a duct according to the method of the present invention.

In FIG. 1, there is illustrated a typical arrangement of an underground duct 10 extending between underground work areas 11 and 12. As is conventional, the duct 10 provides a duct opening to protectively house a transmission cable. The duct may comprise part of an array of ducts, each having an opening to protectively house a transmission cable. Any existing transmission cable in the duct is removed in a manner, per se, well known in the art. Typically, for example, a winch line is connected to an end of an existing cable in one of the work areas 11 and 12 after which tension is applied to the winch line to withdraw the cable from the duct. If desired or necessary, the conductors may be removed from the casing of the existing cable according to the method disclosed in my prior U.S. Pat. No. 4,197,628. A manhole opening 13 provides access to work area 11. Other underground ducts generally indicated by reference numeral 14 extend underground and communicate with work area 11. Similarly, a manhole opening 15 provides access to work area 12 wherein other ducts 16 are accessible. A cable 17 may have a terminal end portion extend from one of the ducts 16 into the work area 12 for connection to a newly-installed cable in duct 10. A cable may extend from some distally-spaced work area through duct 14 to work area 11 and then to a supply reel containing a sufficient quantity of cable, which can be unwound from the reel and fed into duct 10 so as to form an unbroken, continuing run of cable extending to work area 12.

To carry out the method of the present invention, a cable eye 18 on the leading end of a pull line 19 is fed from work area 12 through conduit 10 to work area 11. The pull line is unwound from a storage spool 20 which is rotatably supported by a stand 21 at ground level The storage spool may be coupled to a motor drive 22 which is, in turn, connected to a control 23. Control 23 is of any suitable type for controlling the direction of rotation of the reel by the drive motor and can be used to control the tension developed on the pull line by rotation of the reel. A sufficient length of the pull line is unwound from the reel such that cable eye 18 can be passed through an adapter nozzle 24 and thence through a feeder tube 25. Tube 25 is preferably constructed in a manner disclosed in my U.S. Pat. No. 4,296,157. The cable eye is then drawn through a lubricating collar 26 which preferably embodies a construction disclosed in U.S. Pat. Nos. 4,028,473 or 4,326,605 and coupled to a suitable supply of lubricant As will be described in greater detail hereinafter, an inner duct apparatus is comprised of plastic material whereby the particularly effective lubricant to be applied to the outer surface of the inner duct during placement operation is a water-based polymer which will wet the plastic surface of the inner duct. This type of lubricant will adhere to the surface of the inner duct to insure the presence of effective quantities of lubricant during the placement operation. It is preferable to employ the lubricant embodying the composition disclosed in my U.S. Pat. No. 4,111,820. This lubricant consists of polypropylene glycol, polyethylene oxide and water. The lubricant composition is non-degrading to plastic material and, therefore, especially useful for lubricating the surface of the inner duct apparatus of the present invention as well as a plastic sheathed cable which will be placed in the inner duct.

As shown in FIG. 1, separate strands of inner duct 30 are supplied from three separate supply reels 31, 32 and 33, each supported by a stand 34 that is, in turn, arranged on a suitable support 34A such as the ground surface or preferably, the rear portion of a truck bed.

Figure 3:
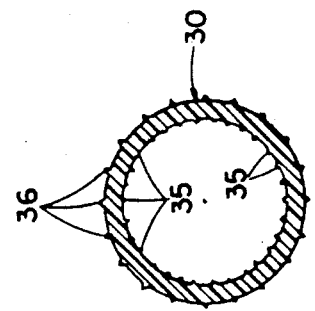
FIG. 3 is an enlarged end view of an inner duct according t the present invention.

As shown in FIG. 3, the inner duct 30 has the form of an open-ended, elongated hollow tube with an endless side wall formed by extruding plastic material. The extruded configuration of the inner duct essentially includes a continuous inner surface comprised of spaced-apart and generally parallel protruding internal ribs 35. Sufficient ribs are formed, typically 10 per linear inch of internal wall surface, to retain a supply of lubricant between the ribs. The lubricant is drawn from the reserve areas between the ribs to protruding edges of the ribs which form the only area of frictional contact with the transmission cable when installed in the inner duct. Preferably, the ribs are widest at their bases and have an inverted V-shaped configuration in cross section, as shown in FIG. 3. The protruding height of the ribs, preferably about 1/32nd of an inch, is effective for the transmission of heat during cable placement operation and for preventing spiraling or twisting of the cable while advanced along the internal ribs. The duct is produced by extruding plastic material and immediately after the extrusion process, the ribs rapidly dissipate heat from the newly-formed extrusion. This enhances the dimensional stability of the inner duct, particularly linearity and the tubular configuration The ribs, therefore, serve to prevent the formation of an oval cross-sectional configuration of the inner duct which is undesirable because it impedes movement of the cable in an inner duct, i.e., the ribs enhance the radial stability of the duct. Also, the enhanced cooling by the ribs prevents twisting of the inner duct along a selected length thereof when coiling and uncoiling The plastic material of the inner duct 30 is preferably comprised of polyethylene. The side walls of the inner duct tube also have a continuous external surface comprised of spaced-apart and generally parallel protruding external ribs 36 extending lengthwise of the tube in a generally parallel and spaced-apart relation which is sufficient to contain a supply of lubricant between the ribs and form the only area of frictional contact with a duct while advanced therealong. The number of ribs 36 per linear inch is generally 4 or 5 per linear inch of external wall surface. The external ribs differ as to their location relative to the internal ribs 35 such that generally a rib 35 and a rib 36 do not extend along a single radius The non-aligned arrangement of ribs maintains dimensional stability of the inner duct. The ribs 36 also provide sites for dissipation of heat that may be generate during placement operation of the inner duct as well as dissipation of heat from ambient sources after the inner duct has been placed Such ambient heat sources are usually discovered along a cable route in areas of the country having a warm climate.

Figure 2:
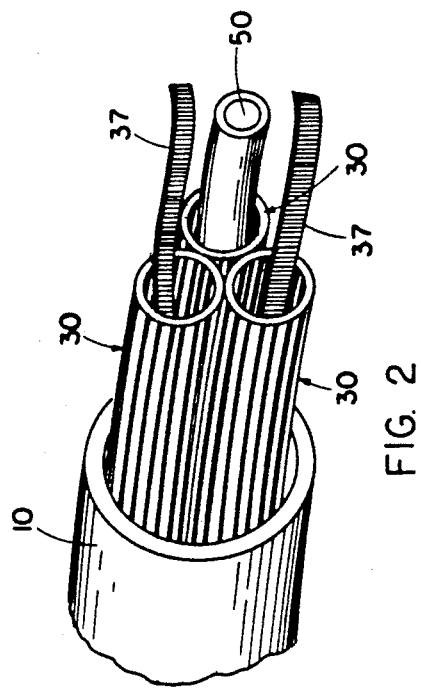
FIG. 2 is an isometric view of a duct in which inner ducts are installed, each for receiving a transmission cable according to the present invention.

A single length of inner duct can be drawn in a duct for installing a transmission cable; however because light-guide cable is small in diameter in relation to the diameter of an existing duct, it is preferred to place a plurality of lengths of inner ducts in side-by-side relationship in a duct. Generally, as many inner ducts as possible are placed in a duct to fill and maintain the integrity of the duct even though, for example, only one light-guide cable may be placed in one of the plurality of inner ducts. In this way, when there is a need to expand the transmission capacity along the route of a transmission cable, additional light-guide cables can be placed in the unused openings of the inner ducts at some future time. It is intended by the design of the inner duct to place three inner ducts 30 in an existing duct such as shown in FIG. 2 of the drawings. The three inner ducts extend in a generally parallel relationship which is effectively maintained by an interlocking engagement between ribs 36. The ribs effectively maintain the triangular arrangement of inner ducts and prevent spiraling of the bundle of inner ducts while advanced along the duct during the placement operation. Spiraling, i.e., twisting of the ducts, one about the other, during advancement along a duct is particularly undesirable since the light-guide cable must follow the tortuous path of an inner duct. Preferably, a pull line 37 is installed in each inner duct before placement in a duct. After placement of the inner duct, a cable end is attached by a gripper, per se, known in the art, and the cable is pulled in the inner duct by the pull line. The pull line is preferably made up of warp and weft threads consisting cf aromatic polyamide fibers as disclosed in my pending application Ser. No. 405,317, filed Aug. 5, 1982. The pull line is installed by attaching a plug to one end of the line and using compressed air or another suitable air supply to force the plug and line along a selected length of inner duct or, if desired, along the entire supply of inner duct on each of the supply reels 31, 32 and 33. The tape can be severed when the selected length of inner duct is taken from a reel and severed from the remaining supply of inner duct. In the event a cable is pulled into one or more, but less than all of the inner ducts in a duct, the pull line in the unused inner duct can be permitted to remain therein until at some future time is desired to place a cable. At that time, the pull line can be used to install a cable in the remaining inner duct.

Figure 6:
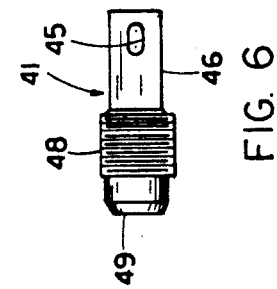
FIG. 6 is an isometric view of a connector fitting for joining the end of an inner duct to a pull cable.
Figure 5:
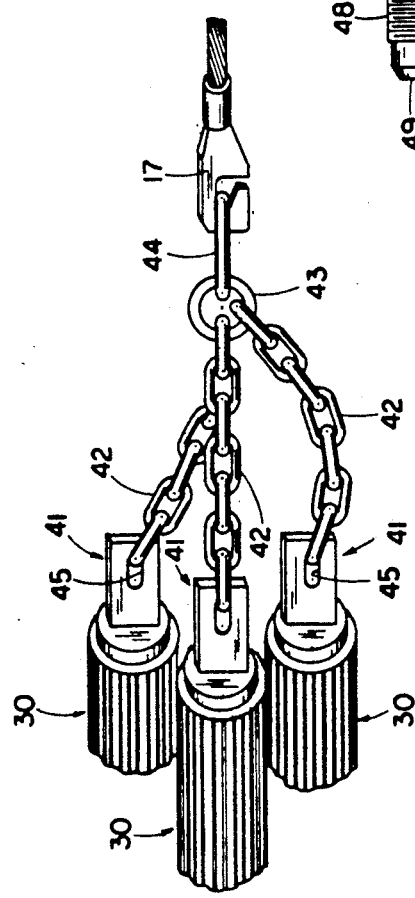
FIG. 5 is an isometric view of apparatus for pulling the inner duct of the present invention in a duct.

To carry out the installation process of an inner duct or a bundle of inner ducts, the cable eye 18 is attached by a chain link as shown in FIG. 5, to fitting 41, there being provided a fitting 41 for each inner duct when a bundle thereof is installed. Three chains 42 are connected at one end of each chain to a coupling ring 43 which is, in turn, connected by a link 44 to the cable eye 18. The free ends of the chains are connected to an opening 45 in each of the fittings 41. The as shown in FIG. 6, each comprises an end portion 46 having the opening 45 therein which extends between parallel flat face surfaces. Portion 46 extends to a threaded shank portion 48 made up of coarse threads with sharp edges at the crest of the thread so that the fitting can be threadedly engaged in an inner duct by rotating the fitting. Preferably, the threads are of self-tapping design and to facilitate the threaded engagement of the fitting with an inner duct, protruding from the threaded portion of the fitting is a guide section 49 to maintain a generally coaxial relationship between the longitudinal axis of the fitting and the center of the inner duct. As best shown in FIG. 5, the opposed, flat face surfaces of portion 46 provide convenient areas for engagement with a wrench to apply torque for establishing threaded engagement with good integrity.

Figure 4:
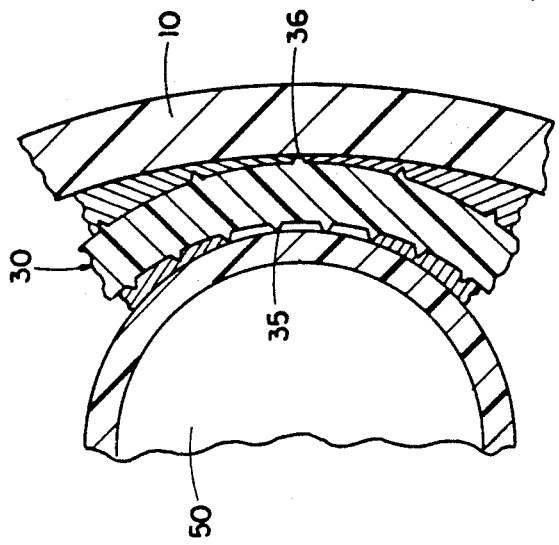
FIG. 4 is an enlarged partial sectional view of a duct containing an inner duct and a transmission cable to illustrate the formation of lubricant reservoirs.

After a suitable length of inner duct or a bundle of inner ducts as shown in FIG. 5 is connected to the pull line as just described, the tension reel is operated to pull the inner ducts in the duct 10. It will be assumed that a bundle of inner ducts is being installed in the duct and after the chains 42 have passed through the lubricating collar 26, the lubricant is delivered to the collar for application to the external surface of the inner duct. To prevent spiraling or twisting of one inner duct about other inner ducts in the bundle, the strands of inner duct unwound from the reels 31, 32, and 33 are preferably carried out by drawing a strand of inner duct from each of the reels 31, 32 and 33 by alternately pulling a strand from the top of the first reel, then pulling a strand from the bottom of the second reel and then pulling a strand from the top of the third reel when the reels are arranged as shown in FIG. 1. Alternating the unwinding sites from the top of one reel to the bottom of the next reel should be carried out when the external surface of the inner duct does not include ribs which, as described previously, produce an interlocking between the ducts and prevent spiraling. The ribs also prevent longitudinal twisting of the inner duct during installation in a duct. The pull cable is then advanced to draw three strands of the inner duct along the guide tube and through nozzles 24 into duct 10. As shown in FIG. 4, reservoirs of lubricant are established by the spaces between ribs 36 and from these reservoirs, lubricant is continuously fed to the protruding edge surfaces of the ribs to maintain an effective lubricant film between the inner duct and the duct 10. After the leading ends of the inner duct strands emerge from the duct 10 in work area 12, the pull line is disconnected from the coupling ring 43 and the fittings 41 are disconnected from the ends of the inner ducts. In work area 11, feeder tube 25 is retracted along with nozzle 24 from the duct 10 to expose the strands of inner duct which are then severed and the unwound lengths of inner duct strands in the guide tube 25 are returned to the reels by rewinding operations.

The transmission cable, which is preferably comprised of light-guide cable, is brought to the installation site in coiled form on a reel that is supported by a stand in the same manner as reels 31-33. The leading end of the light-guide cable is secured to a pull line. Preferably, there is arranged between the pull line and the cable, a tension meter to carry out the cable placement operation in accordance with the disclosures of my copending application Ser. Nos. 346,386 and 405,385. Tension is then applied to the pull line to advance the leading end of the light-guide cable through the lubricating collar 26 along the guide tube 25 and thence into one of the inner ducts. A detector 49, for example, is arranged in work area 12 to detect a tension signal produced by the tension meter. The detected signal is used for controlling tension imposed on the light-guide cable by the pull line. The presence of lubricant on the cable greatly reduces friction and thus the pulling force required to install the cable in the inner duct. It can be seen from FIG. 4, that the protruding ribs from the inner surface of the inner duct provide reservoir areas for lubricant which is supplied to the edges of the ribs to maintain an effective film of lubricant on the outer surface of the cable 50 while advanced in the inner duct 30. The ribs which, as described previously, extend along the length of the inner duct facilitate guiding and prevent twisting of the light-guide cable while advanced in the inner duct. After the leading end of the light-guide cable emerges from the inner duct at the site of work area 12, the pull line is disconnected and the usual connecting operations are carried out to join the light-guide cable to other cable to form part of a communication system. It is to be understood, of course, that another length of light-guide cable can be placed in other inner ducts which extend along duct 10. Such installation procedures are carried out by pulling each light-guide cable individually at different times through an inner duct.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. A radially stable tubular apparatus to protect transmission cable from damage and aid in its installation, said apparatus comprising:

an open-ended, elongated hollow tube having a side wall made of synthetic plastic material with a continuous internal surface comprised of spaced-apart and generally protruding internal ribs extending along the length of the internal surface of the tube, said internal ribs having a height and being spaced apart a distance sufficient to contain a supply of lubricant therebetween and form the only areas of frictional contact with the transmission cable whereby the tube is adapted to support transmission cable on its internal ribs as the cable is inserted therethrough and thereby reduce the frictional contact between the tube and the cable;

an external surface on the side wall having external protruding ribs extending along the length of the tubing, the external ribs being spaced about substantially the entire external surface of the tube so that such external protruding ribs are adapted to touch the surface with which the tube is in contact, wherein there are more internal ribs than external ribs and the external ribs are spaced to hold lubricant therebetween.

2. The tubular apparatus according to claim 1 wherein said internal and external ribs are widest at their bases and the internal ribs and external ribs enhance the radial stability of the tube so that it substantially maintains its shape during and after installation of the tube and the transmission cable.

3. The tubular apparatus of claim 2 wherein the protruding internal and external ribs are generally parallel and are made of the same synthetic plastic as the tube.

4. The tubular apparatus according to claim 3 wherein there is a plurality of tubes in proximity to one another.

5. The tubular apparatus of claim 3, wherein there is a plurality of tubes having their external surfaces in contact with each other so that the ribs on the external surfaces of the tubes form an interlocking relationship and thereby reduce longitudinal twisting of the tubes.

6. The tubular apparatus of claim 5, wherein the plurality of tubes are held in contact with each other by an external means.

7. The tubular apparatus of claim 5, wherein the protruding ribs on the internal and external surfaces are at different radial locations, thus increasing the dimensional stability of the tubes.

8. The tubular apparatus of claim 3 wherein there is a plurality of tubes surrounded by a duct whereby the ribs on the external surface of the tubes contact the duct for reduced sliding friction.

9. The tubular apparatus of claim 8, wherein the ribs on the external surface of the tubes form an interlocking relationship to reduce longitudinal twisting.

* * * * *